(12) United States Patent
Yamamoto et al.

(10) Patent No.: US 12,221,571 B2
(45) Date of Patent: Feb. 11, 2025

(54) PRESSURE-SENSITIVE ADHESIVE LAYER AND PRESSURE-SENSITIVE ADHESIVE SHEET

(71) Applicant: NITTO DENKO CORPORATION, Ibaraki (JP)

(72) Inventors: Shuhei Yamamoto, Osaka (JP); Amane Sawamura, Osaka (JP)

(73) Assignee: NITTO DENKO CORPORATION, Ibaraki (JP)

( * ) Notice: Subject to any disclaimer, the term of this patent is extended or adjusted under 35 U.S.C. 154(b) by 157 days.

(21) Appl. No.: 17/882,753

(22) Filed: Aug. 8, 2022

(65) Prior Publication Data

US 2023/0079057 A1   Mar. 16, 2023

(30) Foreign Application Priority Data

Aug. 25, 2021   (JP) .................. 2021-137429

(51) Int. Cl.
  *C09J 7/38*   (2018.01)
  *C09J 7/26*   (2018.01)
(52) U.S. Cl.
  CPC ............... *C09J 7/385* (2018.01); *C09J 7/26* (2018.01); *C09J 2301/302* (2020.08); *C09J 2433/00* (2013.01)
(58) Field of Classification Search
  None
  See application file for complete search history.

(56) References Cited

U.S. PATENT DOCUMENTS

| | | | |
|---|---|---|---|
| 2013/0095298 A1 | 4/2013 | Shimokawa et al. | |
| 2017/0260425 A1* | 9/2017 | Yamamoto | B32B 27/34 |
| 2017/0306188 A1* | 10/2017 | Fujimoto | B32B 27/36 |
| 2019/0016927 A1* | 1/2019 | Lohmann | C09J 7/385 |
| 2022/0025222 A1 | 1/2022 | Hamada et al. | |

FOREIGN PATENT DOCUMENTS

| | | |
|---|---|---|
| EP | 1 447 434 A1 | 8/2004 |
| EP | 3 878 877 A1 | 9/2021 |
| JP | 2018-104485 A | 7/2018 |
| JP | 2020-090619 A | 6/2020 |

OTHER PUBLICATIONS

Extended European Search Report dated Jan. 19, 2023 in European Application No. 22187150.2.

* cited by examiner

*Primary Examiner* — Chinessa T. Golden
(74) *Attorney, Agent, or Firm* — Sughrue Mion, PLLC (57) ABSTRACT

A pressure-sensitive adhesive layer consists of a dried product of a water-dispersed pressure-sensitive adhesive composition. The water-dispersed pressure-sensitive adhesive composition contains a water-dispersible polymer, water, and polyacrylic acid. The polyacrylic acid content is above 0.1 parts by mass and 7 parts by mass or less with respect to 100 parts by mass of the water-dispersible polymer. A thickness of the pressure-sensitive adhesive layer is 10 μm or more and 40 μm or less.

5 Claims, 2 Drawing Sheets

PRESSURE-SENSITIVE ADHESIVE LAYER AND PRESSURE-SENSITIVE ADHESIVE SHEET

CROSS-REFERENCE TO RELATED APPLICATION

The present application claims priority from Japanese Patent Application No. 2021-137429 filed on Aug. 25, 2021, the contents of which are hereby incorporated by reference into this application.

TECHNICAL FIELD

The present invention relates to a pressure-sensitive adhesive layer and a pressure-sensitive adhesive sheet.

BACKGROUND ART

In recent years, a pressure-sensitive adhesive sheet including a pressure-sensitive adhesive layer is used in various technical fields.

As such a pressure-sensitive adhesive sheet, for example, a double-sided pressure-sensitive adhesive tape including a polyester film (release film), a pressure-sensitive adhesive layer, a support, a pressure-sensitive adhesive layer, and a polyester film (release film) in order has been proposed (ref: for example, Patent Document 1). Further, such a pressure-sensitive adhesive layer is obtained by coating an acrylic pressure-sensitive adhesive obtained by dissolving an acrylic copolymer in ethyl acetate (organic solvent) on a polyester film and forming a coating film.

CITATION LIST

Patent Document

Patent Document 1: Japanese Unexamined Patent Publication No. 2018-104485

SUMMARY OF THE INVENTION

Problem to be Solved by the Invention

On the other hand, in Patent Document 1, an organic solvent is used in preparation of a pressure-sensitive adhesive composition (acrylic pressure-sensitive adhesive). When the organic solvent is used, there is a problem that since the organic solvent volatilizes on coating the pressure-sensitive adhesive composition, an environmental load increases.

In addition, the pressure-sensitive adhesive sheet requires impact resistance and thinning of layers in accordance with its application and purpose.

The present invention provides a pressure-sensitive adhesive layer and a pressure-sensitive adhesive sheet which reduce an environmental load, have excellent impact resistance, and achieve excellent thinning of layers.

Means for Solving the Problem

The present invention [1] includes a pressure-sensitive adhesive layer consisting of a dried product of a water-dispersed pressure-sensitive adhesive composition, wherein the water-dispersed pressure-sensitive adhesive composition contains a water-dispersible polymer, water, and polyacrylic acid; the polyacrylic acid content is above 0.1 parts by mass and 7 parts by mass or less with respect to 100 parts by mass of the water-dispersible polymer; and a thickness of the pressure-sensitive adhesive layer is 10 μm or more and 40 μm or less.

The present invention [2] includes the pressure-sensitive adhesive layer described in the above-described [1], wherein the water-dispersed pressure-sensitive adhesive composition further contains a leveling agent.

The present invention [3] includes the pressure-sensitive adhesive layer described in the above-described [2], wherein the leveling agent content is 1 part by mass or more with respect to 100 parts by mass of the water-dispersible polymer.

The present invention [4] includes the pressure-sensitive adhesive layer described in any one of the above-described [1] to [3], wherein the viscosity at 25° C. of the water-dispersed pressure-sensitive adhesive composition is below 1.5 Pa·s.

The present invention [5] includes a pressure-sensitive adhesive sheet including a substrate and the pressure-sensitive adhesive layer described in any one of the above-described [1] to [4] in order toward one side in a thickness direction, wherein the substrate is a foam.

The present invention [6] includes a pressure-sensitive adhesive sheet including a substrate and the pressure-sensitive adhesive layer described in any one of the above-described [1] to [4] in order toward one side in a thickness direction, wherein the substrate is a polymer film.

Effect of the Invention

A water-dispersed pressure-sensitive adhesive composition forming the pressure-sensitive adhesive layer of the present invention contains a water-dispersible polymer, water, and polyacrylic acid. In the pressure-sensitive adhesive layer which is a dried product of the water-dispersed pressure-sensitive adhesive composition, the polyacrylic acid is segregated to an interface of particles of the water-dispersible polymer. Then, the water-dispersible polymer can maintain a micro particle-shape. Then, since such a water-dispersible polymer relaxes stress, the pressure-sensitive adhesive layer has excellent impact resistance.

In addition, in the water-dispersed pressure-sensitive adhesive composition, the polyacrylic acid content is within a predetermined range. Therefore, the pressure-sensitive adhesive layer which is the dried product of the water-dispersed pressure-sensitive adhesive composition has excellent impact resistance.

Further, the water-dispersed pressure-sensitive adhesive composition does not contain an organic solvent and contains water. Therefore, it is possible to reduce an environmental load.

Further, a thickness of the pressure-sensitive adhesive layer is 10 μm or more and 40 μm or less. Therefore, it is possible to achieve thinning of layers, while maintaining the impact resistance.

The pressure-sensitive adhesive sheet of the present invention includes the pressure-sensitive adhesive layer of the present invention. Therefore, it reduces the environmental load, has excellent impact resistance, and achieves excellent thinning of layers.

BRIEF DESCRIPTION OF THE DRAWINGS

FIGS. 2A and 2B show a schematic view illustrating one embodiment of a method for producing a pressure-sensitive adhesive layer (pressure-sensitive adhesive sheet):

FIG. 2A illustrating a first step of preparing a release film and

FIG. 2B illustrating a second step of forming a pressure-sensitive adhesive layer on one surface in a thickness direction of the release film.

DESCRIPTION OF EMBODIMENTS

One embodiment of a pressure-sensitive adhesive layer of the present invention is described with reference to FIG. 1.

Figure 1:
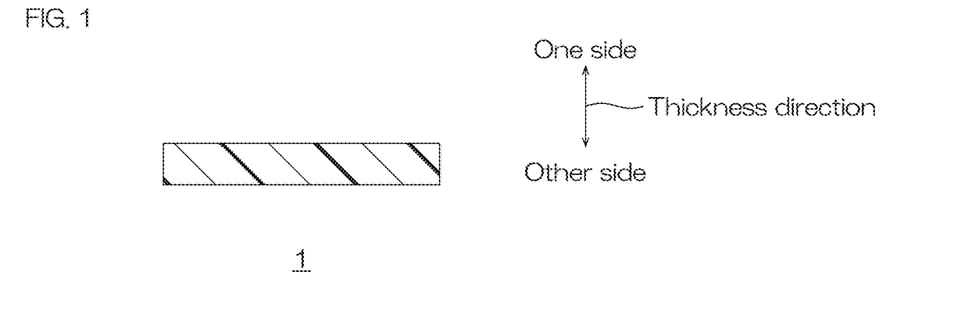
FIG. 1 shows a cross-sectional schematic view in one embodiment of a pressure-sensitive adhesive layer of the present invention.

In FIG. 1, an up-down direction on the plane of the sheet is an up-down direction (thickness direction). An upper side on the plane of the sheet is an upper side (one side in the thickness direction). A lower side on the plane of the sheet is a lower side (the other side in the thickness direction). A right-left direction and a depth direction on the plane of the sheet are a plane direction perpendicular to the up-down direction. Specifically, directions are in conformity with direction arrows in each view.

A pressure-sensitive adhesive layer 1 has a film shape. The pressure-sensitive adhesive layer 1 consists of a dried product of a water-dispersed pressure-sensitive adhesive composition.

<Water-Dispersed Pressure-Sensitive Adhesive Composition>

The water-dispersed pressure-sensitive adhesive composition contains a water-dispersible polymer, water, and polyacrylic acid.

[Water-Dispersible Polymer]

Examples of the water-dispersible polymer include water-dispersed acrylic polymers, water-dispersed urethane polymers, water-dispersed polyaniline polymers, and water-dispersed polyester polymers. Preferably, water-dispersed acrylic polymers are used.

The water-dispersed acrylic polymer is a polymer of a monomer component.

The monomer component contains an alkyl (meth)acrylate as a main component. (Meth) acrylic acid is defined as acrylic acid and/or methacrylic acid.

An example of the alkyl (meth)acrylate includes an alkyl (meth)acrylate having a straight-chain or branched alkyl group having 1 to 20 carbon atoms. Examples of the alkyl (meth)acrylate include methyl (meth)acrylate, ethyl (meth)acrylate, propyl (meth)acrylate, n-butyl (meth)acrylate, isopropyl (meth)acrylate, isobutyl (meth)acrylate, s-butyl (meth)acrylate, t-butyl (meth)acrylate, pentyl (meth)acrylate, isopentyl (meth)acrylate, neopentyl (meth)acrylate, hexyl (meth)acrylate, heptyl (meth)acrylate, 2-ethylhexyl (meth)acrylate, octyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, isotridodecyl (meth)acrylate, tetradecyl (meth)acrylate, isotetradecyl (meth)acrylate, pentadecyl (meth)acrylate, hexadecyl (meth)acrylate, heptadecyl (meth)acrylate, octadecyl (meth)acrylate, isooctadecyl (meth)acrylate, nonadecyl (meth)acrylate, and eicosyl (meth)acrylate. As the alkyl (meth)acylate, preferably, alkyl acylate having an alkyl group having 1 to 12 carbon atoms is used, more preferably, methyl acrylate and 2-ethylhexyl acrylate are used.

These alkyl (meth)acrylates may be used alone or in combination of two or more, and preferably, methyl acrylate and alkyl acrylate having an alkyl group having 2 to 8 carbon atoms are used in combination, more preferably, methyl acrylate and 2-ethylhexyl acrylate are used in combination.

A ratio of the alkyl (meth)acrylate is, for example, 70% by mass or more, preferably 80% by mass or more, more preferably 90% by mass or more, further more preferably 95% by mass or more, and for example, 99.5% by mass or less, preferably 99% by mass or less with respect to the monomer component.

Further, the monomer component may contain one or two or more kinds of functional group-containing vinyl monomers copolymerizable with the alkyl (meth)acrylate. The functional group-containing vinyl monomer serves to modify the acrylic polymer such as ensuring a cohesive force of the acrylic polymer and introducing a cross-linking point into the acrylic polymer.

Examples of the functional group-containing vinyl monomer include carboxy group-containing vinyl monomers (carboxy group-containing monomers), acid anhydride vinyl monomers, hydroxyl group-containing vinyl monomers, sulfo group-containing vinyl monomers, phosphoric acid group-containing vinyl monomers, cyano group-containing vinyl monomers, and glycidyl group-containing vinyl monomers.

Examples of the carboxy group-containing vinyl monomer include acrylic acid, methacrylic acid, 2-carboxyethyl (meth)acrylate, carboxypentyl (meth)acrylate, itaconic acid, maleic acid, fumaric acid, and crotonic acid. Preferably, acrylic acid and/or methacrylic acid are/is used. When the carboxy group-containing vinyl monomer is the acrylic acid and/or the methacrylic acid, tackiness, and mechanical stability of emulsion particles are excellent.

Examples of the acid anhydride vinyl monomer include maleic anhydride and itaconic anhydride.

Examples of the hydroxyl group-containing vinyl monomer include 2-hydroxyethyl (meth)acrylate, 2-hydroxypropyl (meth)acrylate, 2-hydroxybutyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, and (4-hydroxymethylcyclohexyl)methyl (meth)acrylate.

Examples of the sulfo group-containing vinyl monomer include styrene sulfonic acid, allyl sulfonic acid, sodium vinyl sulfonate, 2-(meth)acrylamide-2-methylpropane sulfonate, (meth)acrylamide propane sulfonic acid, sulfopropyl (meth)acrylate, and (meth)acryloyloxy naphthalene sulfonic acid.

An example of the phosphate group-containing vinyl monomer includes 2-hydroxyethylacryloyl phosphate.

Examples of the cyano group-containing vinyl monomer include acrylonitrile and methacrylonitrile.

Examples of the glycidyl group-containing vinyl monomer include glycidyl (meth)acrylate and 2-ethylglycidyl ether (meth)acrylate.

As the functional group-containing vinyl monomer, preferably, a carboxy group-containing vinyl monomer is used. In other words, the monomer component preferably contains a carboxy group-containing vinyl monomer.

A ratio of the functional group-containing vinyl monomer is, for example, 0.5% by mass or more, preferably 1.0% by mass or more, more preferably 1.5% by mass or more with respect to the monomer component. A ratio of the functional group-containing vinyl monomer in the monomer component is, for example, 30% by mass or less, preferably 10% by mass or less, more preferably 5% by mass or less, further more preferably 3% by mass or less.

These functional group-containing vinyl monomers may be used alone or in combination of two or more.

Then, the water-dispersed acrylic polymer is obtained, for example, by emulsion polymerization of the above-described monomer component. In the emulsion polymerization, for example, first, a mixture containing a monomer component, an emulsifier, and water is stirred, thereby preparing a monomer emulsion. Next, a polymerization initiator is added to the monomer emulsion, thereby initiating a polymerization reaction. In the polymerization reaction, a chain transfer agent may be used in order to adjust a molecular weight of the acrylic polymer. Further, additives such as coupling agents and preservatives may be also used. As a polymerization method, dropwise polymerization or collective polymerization may be used. The polymerization time is, for example, 0.5 hours or more, and for example, 10 hours or less. A polymerization temperature is, for example, 50° C. or more, and for example, 80° C. or less.

Examples of the emulsifier include anionic emulsifiers, nonionic emulsifiers, and radically polymerizable emulsifiers (reactive emulsifiers).

Examples of the anionic emulsifier include sodium polyoxyethylene lauryl sulfate, sodium lauryl sulfate, ammonium lauryl sulfate, sodium dodecyl benzene sulfonate, sodium polyoxyethylene alkyl ether sulfate, ammonium polyoxyethylene alkyl phenyl ether sulfate, sodium polyoxyethylene alkyl phenyl ether sulfate, and sodium polyoxyethylene alkyl sulfosuccinate.

Examples of the nonionic emulsifier include polyoxyethylene alkyl ether, polyoxyethylene alkyl phenyl ether, polyoxyethylene fatty acid ester, and polyoxyethylene polyoxypropylene block polymer.

An example of the radically polymerizable emulsifier (reactive emulsifier) includes an emulsifier in which a radically polymerizable functional group is introduced into the above-described anionic emulsifier or the above-described nonionic emulsifier. Examples of the radically polymerizable functional group include vinyl groups, propenyl groups, isopropenyl groups, vinyl ether groups, and allyl ether groups. Specifically, an example thereof includes ammonium-α-sulfonate-ω-1-(allyloxymethyl)alkyloxypolyoxyethylene. When the reactive emulsifier is used, the acrylic polymer which is the water-dispersible polymer obtained by emulsion polymerization includes a monomer unit derived from the reactive emulsifier.

A mixing ratio of the emulsifier is, for example, 0.2 parts by mass or more, and for example, 10 parts by mass or less with respect to 100 parts by mass of the monomer component.

These emulsifiers may be used alone or in combination of two or more.

Examples of the polymerization initiator include azo polymerization initiators and peroxide polymerization initiators.

Examples of the azo polymerization initiator include 2,2'-azobisisobutyronitrile, 2,2'-azobis (2-amidinopropane) dihydrochloride, 2,2'-azobis[2-(5-methyl-2-imidazoline-2-yl)propane]dihydrochloride, 2,2'-azobis{2-[N-(2-carboxyethyl)amidino]propane} n-hydrate, and 2,2'-azobis(N,N'-dimethyleneisobutylamidine).

Examples of the peroxide polymerization initiator include benzoyl peroxide, t-butyl hydroperoxide, and hydrogen peroxide.

As the polymerization initiator, preferably, an azo polymerization initiator is used, more preferably, 2,2'-azobis {2-[N-(2-carboxyethyl)amidino]propane} n-hydrate is used.

A mixing ratio of the polymerization initiator is, for example, 0.01 parts by mass or more, and for example, 2 parts by mass or less with respect to 100 parts by mass of the monomer component.

These polymerization initiators may be used alone or in combination of two or more.

Examples of the chain transfer agent include glycidylmercaptan, mercaptoacetic acid, 2-mercaptoethanol, t-lauryl mercaptan, t-dodecanethiol, thioglycolic acid, 2-ethylhexyl thioglycolic acid, and 2,3-dimercapto-1-propanol, and preferably, t-dodecanethiol is used.

A mixing ratio of the chain transfer agent is, for example, 0.001 parts by mass or more, and for example, 0.5 parts by mass or less with respect to 100 parts by mass of the monomer component.

These chain transfer agents may be used alone or in combination of two or more.

By such emulsion polymerization, the water-dispersed acrylic polymer is prepared as a water-dispersed liquid, to be specific, a water-dispersed liquid (emulsion) in which the water-dispersed acrylic polymer is dispersed in water. That is, the water-dispersed liquid includes a water-dispersible polymer and water.

A weight average molecular weight (Mw) of the water-dispersed acrylic polymer to be obtained is, for example, 100000 or more, preferably 300000 or more, and for example, 5000000 or less, preferably 3000000 or less. The weight average molecular weight of the acrylic polymer is calculated in terms of polystyrene measured by gel permeation chromatography (GPC) (hereinafter, the same).

[Polyacrylic Acid]

The polyacrylic acid is blended in order to improve the impact resistance of the pressure-sensitive adhesive layer 1.

A mixing ratio of the polyacrylic acid is above 0.1 parts by mass, preferably 0.15 parts by mass or more, more preferably 0.25 parts by mass or more, further more preferably 0.8 parts by mass or more, particularly preferably 1.5 parts by mass or more, most preferably 2.5 parts by mass or more, even more preferably 3.3 parts by mass or more, even more preferably 3.8 parts by mass or more, and 7 parts by mass or less, preferably 5 parts by mass or less with respect to 100 parts by mass of the water-dispersible polymer. The mixing ratio of the polyacrylic acid is the polyacrylic acid content contained in the water-dispersed pressure-sensitive adhesive composition (hereinafter, the same).

When the mixing ratio of the polyacrylic acid is above the above-described lower limit or the above-described lower limit or more, it is possible to improve the impact resistance of the pressure-sensitive adhesive layer 1.

On the other hand, when the mixing ratio of the polyacrylic acid is the above-described lower limit or less or below the above-described lower limit, it is impossible to improve the impact resistance of the pressure-sensitive adhesive layer 1.

Further, when the mixing ratio of the polyacrylic acid is the above-described upper limit or less, it is possible to improve the impact resistance of the pressure-sensitive adhesive layer 1.

On the other hand, when the mixing ratio of the polyacrylic acid is above the above-described upper limit, elasticity of the pressure-sensitive adhesive layer 1 increases, so that it is difficult to conform to an adherend, and drop impact properties (impact resistance) decrease. Further, a drying efficiency at the time of producing the pressure-sensitive adhesive layer 1 decreases due to a large ratio of a water-absorbent polymer, and productivity remarkably decreases. Further, moisture is absorbed in the same manner even at the time of storage of the pressure-sensitive adhesive layer 1 (a pressure-sensitive adhesive sheet 3), and the pressure-sensitive adhesive properties are deteriorated due to softening of the pressure-sensitive adhesive layer 1 itself.

Such a polyacrylic acid may be intentionally added at the above-described ratio, or may be generated during a polymerization process.

A weight average molecular weight of the polyacrylic acid is, for example, 50000 or more, preferably 100000 or more, more preferably 150000 or more, and for example, 300000 or less, preferably 250000 or less.

[Leveling Agent]

The water-dispersed pressure-sensitive adhesive composition preferably further contains a leveling agent.

The leveling agent is blended in order to improve coating properties of the water-dispersed pressure-sensitive adhesive composition. Although the details are described later, when the coating properties of the water-dispersed pressure-sensitive adhesive composition are improved, the impact resistance of the pressure-sensitive adhesive layer 1 is improved.

Examples of the leveling agent include "SURFINOL 420" (acetylene glycol ethylene oxide surfactant, manufactured by Nissin Chemical co., ltd.), "PELEX OT-P" (sodium dialkylsulfosuccinate, manufactured by Kao Corporation), "NEOCOL P" (sodium dialkylsulfosuccinate, manufactured by DKS Co., Ltd.), "NOPCO WET 50" (sulfonic acid-based anionic surfactant, manufactured by SAN NOPCO LIMITED), "SN WET 126" (modified silicone/special polyether-based surfactant, manufactured by SAN NOPCO LIMITED), "SN WET FST2" (nonionic wetting agent of polyoxyalkyleneamine, manufactured by SAN NOPCO LIMITED), "SN WET S" (nonionic wetting agent of polyoxyalkyleneamine ether, manufactured by SAN NOPCO LIMITED), and "SN WET 125" (modified silicone-based surfactant, manufactured by SAN NOPCO LIMITED).

As the leveling agent, preferably, sodium dialkylsulfosuccinate is used.

Further, the number of carbon atoms of the sodium dialkylsulfosuccinate is, for example, 4 or more, preferably 6 or more, more preferably 8 or more, and for example, 20 or less, preferably 13 or less, more preferably 10 or less.

A mixing ratio of the leveling agent is, for example, 1 part by mass or more, preferably 1.5 parts by mass or more, and for example, 3.5 parts by mass or less, preferably 2.5 parts by mass or less with respect to 100 parts by mass of the water-dispersible polymer from the viewpoint of improving the coating properties of the water-dispersed pressure-sensitive adhesive composition. The mixing ratio of the leveling agent is the leveling agent content contained in the water-dispersed pressure-sensitive adhesive composition (hereinafter, the same).

Further, the mixing ratio of the leveling agent is, for example, 10 parts by mass or more, and for example, 500 parts by mass or less with respect to 100 parts by mass of the polyacrylic acid.

Specifically, when the mixing ratio of the polyacrylic acid is above 0.1 parts by mass and below 2.5 parts by mass with respect to 100 parts by mass of the water-dispersible polymer, the mixing ratio of the leveling agent is, for example, 150 parts by mass or more, preferably 250 parts by mass or more, more preferably 350 parts by mass or less, and for example, 500 parts by mass or less, preferably 450 parts by mass or less with respect to 100 parts by mass of the polyacrylic acid. Further, when the mixing ratio of the polyacrylic acid is 2.5 parts by mass or more and 7 parts by mass or less with respect to 100 parts by mass of the water-dispersible polymer, the mixing ratio of the leveling agent is, for example, 10 parts by mass or more, preferably 30 parts by mass or more, and for example, below 150 parts by mass, preferably 120 parts by mass or less, more preferably 80 parts by mass or less, further more preferably 50 parts by mass or less with respect to 100 parts by mass of the polyacrylic acid.

When the mixing ratio of the leveling agent is the above-described lower limit or more or the above-described upper limit or less, it is possible to improve the coating properties of the water-dispersed pressure-sensitive adhesive composition.

These leveling agents may be used alone or in combination of two or more.

[Another Component]

The water-dispersed pressure-sensitive adhesive composition may also contain another component. Examples of the other component include tackifiers, release auxiliaries, silane coupling agents, thickeners, cross-linking agents (for example, 3-methacryloxypropyltrimethoxysilane), fillers, antioxidants, surfactants, and antistatic agents.

Examples of the tackifier include various tackifier resins such as rosin-based resins, rosin derivative resins, petroleum-based resins, terpene-based resins, phenol-based resins, and ketone-based resins, and preferably, rosin-based resins and terpene-based resins are used, more preferably, terpene-based resins are used.

The tackifier content is, for example, 5 parts by mass or more, preferably 15 parts by mass or more, more preferably 25 parts by mass or more, further more preferably, 33 parts by mass or more, and for example, 50 parts by mass or less, preferably 45 parts by mass or less, more preferably 38 parts by mass or less with respect to 100 parts by mass of the water-dispersible polymer.

These other components may be used alone or in combination of two or more.

[Organic Solvent]

The water-dispersed pressure-sensitive adhesive composition does not contain an organic solvent. Therefore, it is possible to reduce an environmental load.

[Preparation of Water-Dispersed Pressure-Sensitive Adhesive Composition]

The water-dispersed pressure-sensitive adhesive composition can be prepared, for example, by adding the polyacrylic acid and each component (a leveling agent to be blended if necessary, and another component to be blended if necessary) to a water-dispersed liquid of the water-dispersible polymer (the water-dispersed liquid contains a water-dispersible polymer and water). In addition, in the water-dispersed pressure-sensitive adhesive composition, the water content thereof is increased or decreased, thereby adjusting the solid content concentration.

The solid content concentration of the water-dispersed pressure-sensitive adhesive composition is, for example, 10% by mass or more, preferably 20% by mass or more, and for example, 60% by mass or less, preferably 45% by mass or less.

The viscosity (viscosity at 25° C.) of the water-dispersed pressure-sensitive adhesive composition is, for example, below 1.5 Pa·s, preferably 1.0 Pa·s or less, more preferably 0.8 Pa·s or less, further more preferably 0.6 Pa·s or less, and for example, 0.4 Pa·s or more from the viewpoint of improving the coating properties of the water-dispersed pressure-sensitive adhesive composition.

Although the details are described in Examples to be described later, the viscosity can be measured at a measurement temperature of 25° C. with a B-type viscometer.

<Method for Producing Pressure-Sensitive Adhesive Layer>

One embodiment of a method for producing the pressure-sensitive adhesive layer 1 (the pressure-sensitive adhesive sheet 3) is described with reference to FIGS. 2A and 2B.

A method for producing the pressure-sensitive adhesive layer 1 (the pressure-sensitive adhesive sheet 3) includes a first step of preparing a release film 2 and a second step of forming the pressure-sensitive adhesive layer 1 on one surface in the thickness direction of the release film 2.

[First Step]

Figure 2A:
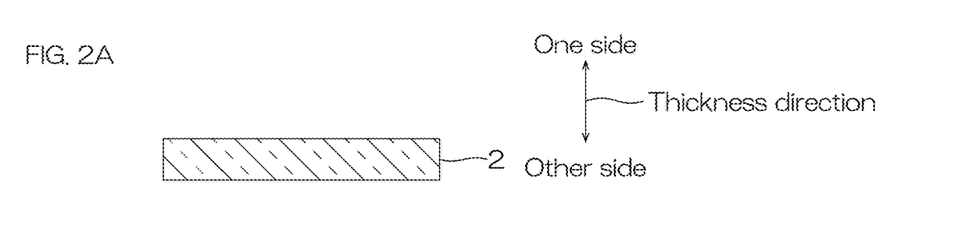

In the first step, as referred to FIG. 2A, the release film 2 is prepared.

The release film 2 is a film for covering and protecting the pressure-sensitive adhesive layer 1. The release film 2 has a film shape.

The release film 2 is a plastic substrate (plastic film), and examples thereof include polyester sheets (polyethylene terephthalate (PET) sheet), polyolefin sheets (for example, polyethylene sheet, polypropylene sheet), polyvinyl chloride sheets, polyimide sheets, and polyamide sheets (nylon sheet). The surface (one surface in the thickness direction) of the release film 2 may be subjected to surface treatment such as silicone treatment.

A thickness of the release film 2 is, for example, 1 μm or more, and for example, 100 μm or less.

[Second Step]

Figure 2B:
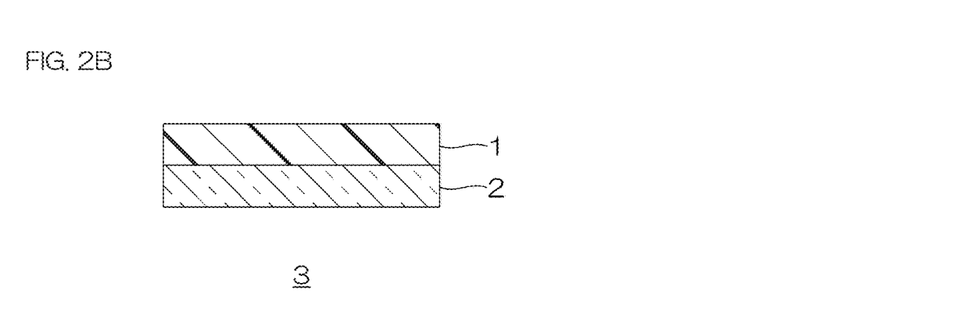

In the second step, as referred to FIG. 2B, the pressure-sensitive adhesive layer 1 is formed on one surface in the thickness direction of the release film 2.

Specifically, a water-dispersed pressure-sensitive adhesive composition is coated on one surface in the thickness direction of the release film 2, thereby forming a coating film. Thereafter, the coating film is dried, thereby forming the pressure-sensitive adhesive layer 1 which is a dried product of the water-dispersed pressure-sensitive adhesive composition. At this time, since the water-dispersed pressure-sensitive adhesive composition does not contain an organic solvent, it is possible to reduce the environmental load.

Thus, the pressure-sensitive adhesive layer 1 is formed on one surface in the thickness direction of the release film 2.

A thickness of the pressure-sensitive adhesive layer 1 is 10 μm or more, and 40 μm or less, preferably 30 μm or less.

When the thickness of the pressure-sensitive adhesive layer 1 is the above-described lower limit or more, it is possible to improve the impact resistance.

On the other hand, when the thickness of the pressure-sensitive adhesive layer 1 is below the above-described lower limit, the impact resistance decreases.

Further, when the thickness of the pressure-sensitive adhesive layer 1 is the above-described upper limit or less, it is possible to achieve thinning of layers.

On the other hand, when the thickness of the pressure-sensitive adhesive layer 1 is above the above-described upper limit, the effect of achieving the thinning of layers decreases, while the impact resistance is maintained.

That is, by setting the thickness of the pressure-sensitive adhesive layer 1 within the above-described range, it is possible to achieve the thinning of layers, while having excellent impact resistance.

Thus, along with the production of the pressure-sensitive adhesive layer 1, the pressure-sensitive adhesive sheet 3 including the release film 2 and the pressure-sensitive adhesive layer 1 in order toward one side in the thickness direction is produced.

A thickness of the pressure-sensitive adhesive sheet 3 is, for example, 500 μm or less, preferably 400 μm or less, more preferably 300 μm or less, more preferably 200 μm or less, and for example, 10 μm or more, more preferably 30 μm or more, further more preferably 50 μm or more.

<Function and Effect>

The water-dispersed pressure-sensitive adhesive composition forming the pressure-sensitive adhesive layer 1 contains the water-dispersible polymer, the water, and the polyacrylic acid.

Figure 4:
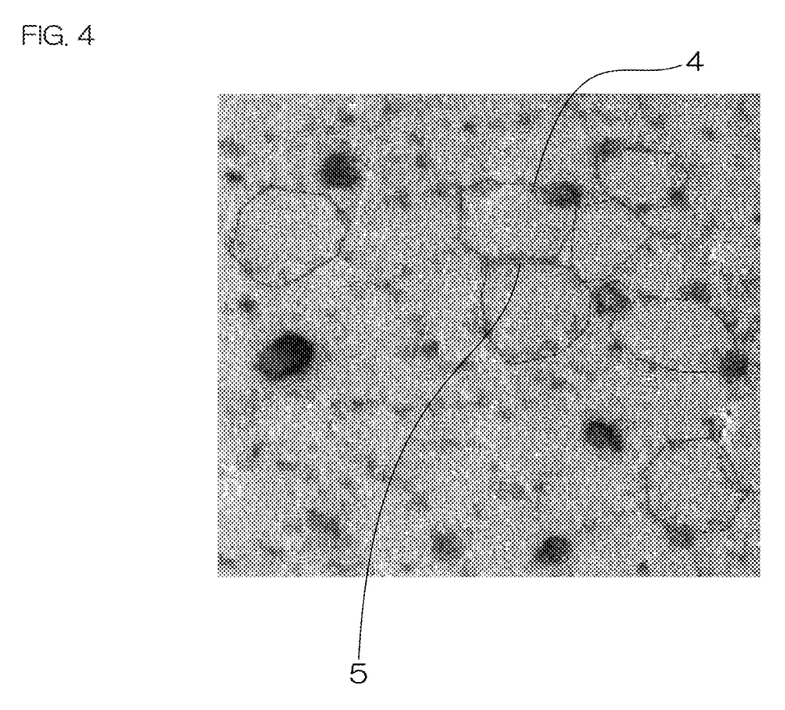
FIG. 4 shows a photograph of a transmission electron microscope of a pressure-sensitive adhesive layer of Example 1.

Then, a photograph of a transmission electron microscope of the pressure-sensitive adhesive layer 1 which is the dried product of the water-dispersed pressure-sensitive adhesive composition is shown in FIG. 4 (specifically, FIG. 4 is the photograph of the transmission electron microscope of the pressure-sensitive adhesive layer of Example 1 to be described later).

According to FIG. 4, in the pressure-sensitive adhesive layer 1, the polyacrylic acid is segregated to an interface 5 of particles of a water-dispersible polymer 4 (dotted line in FIG. 4). Then, the water-dispersible polymer 4 can maintain a micro particle-shape. Then, since the water-dispersible polymer 4 relaxes stress, the pressure-sensitive adhesive layer 1 has excellent impact resistance.

In addition, in the water-dispersed pressure-sensitive adhesive composition, a mixing ratio of the polyacrylic acid is within a predetermined range. Therefore, the pressure-sensitive adhesive layer 1 has excellent impact resistance.

Further, the water-dispersed pressure-sensitive adhesive composition does not contain an organic solvent and contains water. Therefore, it is possible to reduce the environmental load.

Also, the water-dispersed pressure-sensitive adhesive composition preferably further contains a leveling agent. When the water-dispersed pressure-sensitive adhesive composition contains the leveling agent, it is possible to improve the coating properties of the water-dispersed pressure-sensitive adhesive composition.

Figure 3:
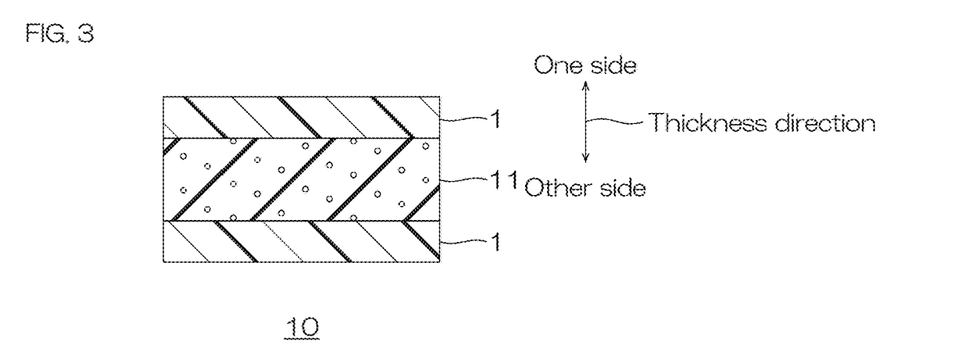
FIG. 3 shows a cross-sectional schematic view in one embodiment of a pressure-sensitive adhesive sheet of the present invention.

On the other hand, when the coating properties of the water-dispersed pressure-sensitive adhesive composition are low, the pressure-sensitive adhesive layer 1 may not be smoothly formed with respect to a substrate 11 (described later). When the pressure-sensitive adhesive layer 1 cannot be smoothly formed, adhesion of the pressure-sensitive adhesive layer 1 with respect to the substrate 11 (described later) decreases, and as a result, the impact resistance may decrease.

On the other hand, in the pressure-sensitive adhesive layer 1, since the water-dispersed pressure-sensitive adhesive composition preferably contains the leveling agent, it is possible to improve the coating properties of the water-dispersed pressure-sensitive adhesive composition. Thus, it is possible to smoothly form the pressure-sensitive adhesive layer 1 with respect to the substrate 11 (described later). As a result, the adhesion of the pressure-sensitive adhesive layer 1 with respect to the substrate 11 (described later) is improved, and it is possible to further improve the impact resistance of the pressure-sensitive adhesive layer 1.

Further, a thickness of the pressure-sensitive adhesive layer 1 is 10 μm or more and 40 μm or less. Therefore, it is possible to achieve the thinning of layers, while maintaining the impact resistance.

As described above, since the pressure-sensitive adhesive layer 1 reduces the environmental load, has excellent impact resistance, and achieves excellent thinning of layers, it can be preferably used in, in particular, the production of electronic devices.

Specifically, in recent years, electronic devices (for example, mobile phones, mobile games, and wearable terminals) may be used by carrying. In such a case, the impact resistance against dropping of the electronic device is required. Further, such an electronic device requires thinning.

On the other hand, since the pressure-sensitive adhesive layer 1 has excellent impact resistance and achieves excellent thinning of layers, it satisfies the demand of the impact resistance and the thinning in the electronic device.

In the following, one embodiment of a pressure-sensitive adhesive sheet of the present invention preferably used in electronic devices is described with reference to FIG. 3.

A double-sided tape 10 includes the pressure-sensitive adhesive layer 1, the substrate 11, and the pressure-sensitive adhesive layer 1 in order toward one side in the thickness direction. Specifically, the double-sided tape 10 includes the pressure-sensitive adhesive layer 1, the substrate 11 directly disposed on the upper surface (one surface in the thickness direction) of the pressure-sensitive adhesive layer 1, and the pressure-sensitive adhesive layer 1 directly disposed on the upper surface (one surface in the thickness direction) of the substrate 11. In other words, the double-sided tape 10 includes the substrate 11 and the pressure-sensitive adhesive layer 1 in order toward one side in the thickness direction.

The pressure-sensitive adhesive layer 1 is the dried product of the above-described water-dispersed pressure-sensitive adhesive composition.

From the viewpoint of the impact resistance, an example of the substrate 11 includes a foam. Examples of the foam include ethylene-propylene-diene rubber foam (EPDM foam), ethylene-propylene foam (EPM foam), polyurethane foam, polystyrene foam, polyolefin foam, and chloroprene foam.

A thickness of the substrate 11 is preferably thicker than that of the pressure-sensitive adhesive layer 1, and is, for example, above 40 μm, preferably 60 μm or more, more preferably 80 μm or more, and for example, 120 μm or less, preferably 100 μm or less.

Then, the double-sided tape 10 is produced by coating a water-dispersed pressure-sensitive adhesive composition on one surface and the other surface in the thickness direction of the substrate 11 to be dried.

Since the double-sided tape 10 includes the above-described pressure-sensitive adhesive layer 1, it reduces the environmental load, has excellent impact resistance, and achieves excellent thinning of layers.

Modified Example

In each modified example, the same reference numerals are provided for members and steps corresponding to each of those in one embodiment, and their detailed description is omitted. Each modified example can achieve the same function and effect as that of one embodiment unless otherwise specified. Furthermore, one embodiment and the modified example can be appropriately used in combination.

In the above-described description, a foam is used as the substrate 11. Alternatively, a polymer film may be also used instead of the foam. By using the pressure-sensitive adhesive layer 1, even when the polymer film is used as the substrate 11, its adhesion can be excellent. Therefore, it is possible to obtain the double-sided tape 10 (pressure-sensitive adhesive sheet) which can significantly achieve the thinning of layers, while exhibiting excellent impact resistance in the same manner as a case of using the foam.

Examples of a material for the polymer film include olefin resins, polyester resins, (meth)acrylic resins (acrylic resin and/or methacrylic resin), polycarbonate resins, polyether sulfone resins, polyarylate resins, melamine resins, polyamide resins, polyimide resins, cellulose resins, and polystyrene resins. Examples of the olefin resin include polyethylene, polypropylene, and cycloolefin polymer. Examples of the polyester resin include polyethylene terephthalate (PET), polybutylene terephthalate, and polyethylene naphthalate. An example of the (meth)acrylic resin includes polymethacrylate. As a material for the substrate 1, preferably, a polyester resin is used, more preferably, polyethylene terephthalate (PET) is used.

A thickness of the polymer film is, for example, 1 μm or more, preferably 3 μm or more, and for example, 100 μm or less, preferably 50 μm or less, more preferably 20 μm or less, further more preferably 10 μm or less.

In addition, in the above-described description, the double-sided tape 10 includes the pressure-sensitive adhesive layer 1 on both surfaces (one surface and the other surface in the thickness direction) of the substrate 11. Alternatively, the pressure-sensitive adhesive layer 1 can be also provided on only one surface (one surface or the other surface in the thickness direction) of the substrate 11.

EXAMPLES

Next, the present invention is further described based on Examples and Comparative Examples below. The present invention is however not limited by these Examples and Comparative Examples. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

<Details of Each Component>

The details of each component are as follows.

AQUARON KH1025: ammonium-α-sulfonato-ω-1-(allyloxymethyl)alkyloxypolyoxyethylene, emulsifier, manufactured by DKS Co., Ltd.

VA-057: 2,2'-azobis{2-[N-(2-carboxyethyl)amidino]propane} n-hydrate, polymerization initiator, manufactured by FUJIFILM Wako Pure Chemical Corporation KBM-503: 3-methacryloxypropyltrimethoxysilane, cross-linking agent, manufactured by Shin-Etsu Chemical Co., Ltd.

ARON A-10H: polyacrylic acid, weight average molecular weight of 200000, manufactured by TOAGOSEI CO., LTD.

PELEX OT-P: sodium dialkylsulfosuccinate (8 carbon atoms), leveling agent, manufactured by Kao Corporation TAMANOL E-200NT, terpene-based resin, tackifier, manufactured by ARAKAWA Chemical Industries, Ltd.

KE-802: polymerized rosin, tackifier, manufactured by ARAKAWA Chemical Industries, Ltd.

NS-100H: rosin ester, tackifier, manufactured by ARAKAWA Chemical Industries, Ltd.

YS Polyster-S145: terpene phenol resin, tackifier, softening point of 145° C., manufactured by YASUHARA CHEMICAL CO., LTD.

PENSEL D-125: polymerized rosin ester resin, softening point of 125° C., manufactured by ARAKAWA Chemical Industries, Ltd.

Coronate L: isocyanate-based cross-linking agent, manufactured by TOSOH CORPORATION TETRAD-C: epoxy-based cross-linking agent, manufactured by Mitsubishi Gas Chemical Company, Inc.

<Production of Water-Dispersible Polymer>

Production Example 1

To a reaction vessel equipped with a thermometer, a stirrer, a nitrogen introduction tube, and a reflux condenser tube, 0.07 parts by mass of AQUARON KH1025 (emulsifier) and 61.1 parts by mass of distilled water were added, and the mixture was replaced with nitrogen at room temperature (25° C.) for one hour while stirring. Thereafter, 0.1 parts by mass of VA-057 (polymerization initiator) was added thereto, and the mixture was brought to 60° C.

Then, 85 parts by mass of 2-ethylhexyl acrylate, 13 parts by mass of methyl acrylate, 1.25 parts by mass of acrylic acid, 0.75 parts by mass of methacrylic acid, 0.025 parts by mass of t-dodecanethiol (chain transfer agent), 0.02 parts by mass of KBM-503 (cross-linking agent), and 1.93 parts by mass of AQUARON KH1025 (emulsifier) were polymerized by emulsifying with 28 parts by mass of distilled water dropwise at 60° C. over a period of 4 hours. Thereafter, a water-dispersible polymer was produced by cooling the polymerized product to room temperature and adjusting a pH thereof to 6 using 10% ammonia water as a pH adjusting agent.

<Production of Acrylic Polymer>

Production Example 2

A reaction vessel equipped with a stirrer, a thermometer, a nitrogen gas introduction tube, a reflux condenser tube, and a dropping funnel was charged with 95 parts by mass of butyl acrylate, 5 parts by mass of acrylic acid, 2,2'-azobisisobutyronitrile (AIBN) (polymerization initiator), and ethyl acetate (polymerization solvent), and the resulting product was solution-polymerized at 60° C. for 6 hours, thereby obtaining a solution of an acrylic polymer. A weight average molecular weight of the acrylic polymer was $60 \times 10^4$.

Production Example 3

A reaction vessel equipped with a stirrer, a thermometer, a nitrogen gas introduction tube, a reflux condenser tube, and a dropping funnel was charged with 70 parts by mass of butyl acrylate, 30 parts by mass of 2-ethylhexyl acrylate, 3 parts by mass of acrylic acid, 0.05 parts by mass of 4-hydroxybutylacrylate, 0.2 parts by mass of 2,2'-azobisisobutyronitrile (AIBN) (polymerization initiator), and toluene (polymerization solvent), and the resulting product was solution-polymerized at 60° C. for 6 hours, thereby obtaining a solution of an acrylic polymer. A weight average molecular weight of the acrylic polymer was $55 \times 10^4$.

Example 1

[Production of Water-Dispersed Pressure-Sensitive Adhesive Composition]

With respect to 100 parts by mass of the water-dispersible polymer of Production Example 1, 30 parts by mass of TAMANOL E-200NT (tackifier), 3 parts by mass of ARON A-10H (polyacrylic acid), and 1 part by mass of PELEX OT-P (leveling agent) were added, and the mixture was diluted and neutralized with distilled water and 10% ammonia water, thereby producing a water-dispersed pressure-sensitive adhesive composition (solid content concentration of 25% by mass).

[Production of Pressure-Sensitive Adhesive Layer (Pressure-Sensitive Adhesive Sheet)]

(First Step)

A release film (trade name: "DIAFOIL MRF #38", manufactured by Mitsubishi Chemical Holdings Corporation) was prepared.

(Second Step)

A water-dispersed pressure-sensitive adhesive composition was coated on one surface in the thickness direction of the release film, thereby forming a coating film. Thereafter, the coating film was dried, thereby producing a pressure-sensitive adhesive layer (thickness of 10 μm) which was a dried product of the water-dispersed pressure-sensitive adhesive composition and a pressure-sensitive adhesive sheet.

Examples 2 to 21 and Comparative Examples 1 to 4

A pressure-sensitive adhesive layer and a pressure-sensitive adhesive sheet were produced in the same manner as in Example 1. The mixing formulation and the thickness of the pressure-sensitive adhesive layer were changed in accordance with Tables 1 and 2. The solid content concentration and the viscosity were adjusted with distilled water and ammonia water.

Example 22

A pressure-sensitive adhesive layer and a pressure-sensitive adhesive sheet were produced in the same manner as in Example 1 using the water-dispersed pressure-sensitive adhesive composition of Example 1. However, a polyethylene terephthalate (PET) resin film (polymer film) (manufactured by Mitsubishi Chemical Holdings Corporation, trade name: "K-880-4.5W", 4.5 μm) was used instead of the release film. Also, a pressure-sensitive adhesive layer was formed on both surfaces of the polymer film.

Comparative Example 5

With respect to 100 parts by mass of the acrylic polymer of Production Example 2, 20 parts by mass of YS Polyster S145 (tackifier), 2 parts by mass of CORONATE L (isocyanate-based cross-linking agent), and 0.01 parts by mass of TETRAD-C (epoxy-based cross-linking agent) were added, and the mixture was stirred and mixed, thereby preparing a pressure-sensitive adhesive composition.

Then, the pressure-sensitive adhesive layer and the pressure-sensitive adhesive sheet were produced in the same manner as in Example 1 using the above-described pressure-sensitive adhesive composition.

Comparative Examples 6 and 7

A pressure-sensitive adhesive layer was produced in the same manner as in Comparative Example 5. A thickness of the pressure-sensitive adhesive layer was changed in accordance with Table 3. The solid content concentration and the viscosity were adjusted with distilled water and ammonia water.

Comparative Example 8

With respect to 100 parts by mass of the acrylic polymer of Production Example 3, 30 parts by mass of PENSEL D-125 (tackifier) and 3 parts by mass of CORONATE L (isocyanate-based cross-linking agent) were added, and the mixture was stirred and mixed, thereby preparing a pressure-sensitive adhesive composition.

Then, a pressure-sensitive adhesive layer and a pressure-sensitive adhesive sheet were produced in the same manner as in Example 1 using the above-described pressure-sensitive adhesive composition.

Comparative Examples 9 to 12

A pressure-sensitive adhesive layer was produced in the same manner as in Comparative Example 8. However, the thickness, the solid content concentration, and the viscosity of the pressure-sensitive adhesive layer were changed in accordance with Table 3. The solid content concentration and the viscosity were adjusted with distilled water and ammonia water.

Comparative Example 13

A pressure-sensitive adhesive layer and a pressure-sensitive adhesive sheet were produced in the same manner as in Comparative Example 8 using the water-dispersed pressure-sensitive adhesive composition of Comparative Example 8. However, a polyethylene terephthalate (PET) resin film (polymer film) (manufactured by Mitsubishi Chemical Holdings Corporation, trade name: "K-880-4.5W", 4.5 µm) was used instead of the release film. Also, a pressure-sensitive adhesive layer was formed on both surfaces of the polymer film.

<Evaluation>

[Viscosity]

The viscosity (Pa·s) of each of the water-dispersed pressure-sensitive adhesive compositions of Examples and Comparative Examples was measured using a B-type viscometer (manufactured by TOKIMEC INC.). A measurement temperature was set at 25° C., the number of rotations of No. 2 rotor was set at 20 rpm, and the measurement time was set at one minute. The results are shown in Tables 1 to 3.

[Transmission Electron Microscope]

The pressure-sensitive adhesive layer of Example 1 was subjected to a heavy metal dyeing process, and TEM observation of a sample cross section was carried out by an ultrathin sectioning method. As a TEM analyzer, for example, TEM (type: "H-7650") manufactured by Hitachi, Ltd. was used. The results are shown in FIG. 4.

[Impact Resistance]

Each of the pressure-sensitive adhesive sheets of Examples and Comparative Examples was punched in a frame shape having an outer diameter of 24.5 mm square with a width of 2 mm to be used an evaluation sample. The evaluation sample was placed between a stainless steel plate having a hole of a height of 20 mm and a length of 20 mm in a square central portion having a thickness of 2 mm and an outer shape of 50 mm×50 mm, and a square stainless steel plate (outer diameter of 25 mm square, thickness of 3 mm); compressively bonded (62N× 10 seconds) so as to be uniformly applied in a gravitational direction; and then, left to stand at 80° C. for 30 minutes. Thereafter, the evaluation sample was taken out and brought to 23° C.

Then, a cylindrical measurement table having a length of 50 mm, an outer diameter of 49 mm, and an inner diameter of 43 mm was set on a pedestal of a Dupont impact tester (manufactured by Toyo Seiki Seisaku-sho), and the evaluation sample was disposed thereon with the square stainless steel plate facing the lower side.

Next, a stainless steel impact shaft having a tip radius of 3.1 mm was placed on an evaluation sample, and a weight of the dropping weight and a dropping height were changed from 50 mm to 500 mm by 50 mm at 50 g, from 50 mm to 500 mm by 50 mm at 100 g, from 350 mm to 500 mm by 50 mm at 150 g, from 400 mm to 500 mm by 50 mm at 200 g, and from 350 mm to 500 mm by 50 mm at 300 g so that the energy was increased until peeling occurred. At this time, the test was not carried out for the energy that had been evaluated, and the load and the height were set so that an amount of energy did not overlap. Thereafter, the energy before the peeling occurred was referred to as a result of load×height. The results are shown in Tables 1 to 3.

The impact resistance was evaluated based on the following criteria:

Excellent: energy before peeling occurred was above 0.2 J

Bad: energy before peeling occurred was 0.2 J or less

TABLE 1

| | | | Comparative Ex. 1 | Ex. 1 | Ex. 2 | Comparative Ex. 2 | Comparative Ex. 3 | Ex. 3 | Ex. 4 |
|---|---|---|---|---|---|---|---|---|---|
| | Ex. Comparative Ex. No. | | | | | | | | |
| Water-Dispersed Pressure-Sensitive Adhesive Composition | Water-Dispersible Polymer | Water-Dispersible Polymer of Production Ex. 1 | 100 | 100 | 100 | 100 | 100 | 100 | 100 |
| | Acrylic Polymer | Acrylic Polymer of Production Ex. 2 | — | — | — | — | — | — | — |
| | | Acrylic Polymer of Production Ex. 3 | — | — | — | — | — | — | — |
| | Polyacrylic Acid | | 3 | 3 | 3 | — | 0.1 | 0.2 | 1 |
| | Leveling Agent | OT-P | 1 | 1 | 1 | 1 | 1 | 1 | 1 |
| | Tackifier | TAMANOL E-200NT | 30 | 30 | 30 | 30 | 30 | 30 | 30 |
| | | KE-802 | — | — | — | — | — | — | — |
| | | NS-100H | — | — | — | — | — | — | — |
| | | YS Polyester S145 | — | — | — | — | — | — | — |
| | | PENSEL D-125 | — | — | — | — | — | — | — |

TABLE 1-continued

| Evaluation | Solid Content Concentration (% by mass) | | | 25 | 25 | 25 | 25 | 25 | 25 | 25 |
|---|---|---|---|---|---|---|---|---|---|---|
| | Viscosity (Pa · s) | | | 0.5 | 0.5 | 0.5 | 0.95 | 0.95 | 0.95 | 0.95 |
| | Thickness of Pressure-Sensitive Adhesive Layer (μm) | | | 5 | 10 | 20 | 20 | 20 | 20 | 20 |
| | Impact Resistance (J) | | | 0.05 | 0.361 | 0.77 | 0.13 | 0.19 | 0.21 | 0.33 |
| | Evaluation of Impact Resistance | | | Bad | Excellent | Excellent | Bad | Bad | Excellent | Excellent |

| | | Ex. Comparative Ex. No. | Ex. 5 | Ex. 6 | Ex. 7 | Ex. 8 | Comparative Ex. 4 |
|---|---|---|---|---|---|---|---|
| Water-Dispersed Pressure-Sensitive Adhesive Composition | Water-Dispersible Polymer | Water-Dispersible Polymer of Production Ex. 1 | 100 | 100 | 100 | 100 | 100 |
| | Acrylic Polymer | Acrylic Polymer of Production Ex. 2 | — | — | — | — | — |
| | | Acrylic Polymer of Production Ex. 3 | — | — | — | — | — |
| | Polyacrylic Acid | | 2 | 3 | 3.5 | 4 | 8 |
| | Leveling Agent | OT-P | 1 | 1 | 1 | 1 | 1 |
| | Tackifier | TAMANOL E-200NT | 30 | 30 | 30 | 30 | 30 |
| | | KE-802 | — | — | — | — | — |
| | | NS-100H | — | — | — | — | — |
| | | YS Polyster S145 | — | — | — | — | — |
| | | PENSEL D-125 | — | — | — | — | — |
| Evaluation | Solid Content Concentration (% by mass) | | 25 | 25 | 25 | 25 | 25 |
| | Viscosity (Pa · s) | | 0.95 | 0.95 | 0.95 | 0.95 | 0.95 |
| | Thickness of Pressure-Sensitive Adhesive Layer (μm) | | 20 | 20 | 20 | 20 | 20 |
| | Impact Resistance (J) | | 0.345 | 0.77 | 0.802 | 0.917 | 0.18 |
| | Evaluation of Impact Resistance | | Excellent | Excellent | Excellent | Excellent | Bad |

TABLE 2

| | | Ex. Comparative Ex. No. | Ex. 9 | Ex. 10 | Ex. 11 | Ex. 12 | Ex. 13 | Ex. 14 | Ex. 15 | Ex. 16 |
|---|---|---|---|---|---|---|---|---|---|---|
| Water-Dispersed Pressure-Sensitive Adhesive Composition | Water-Dispersible Polymer | Water-Dispersible Polymer of Production Ex. 1 | 100 | 100 | 100 | 100 | 100 | 100 | 100 | 100 |
| | Acrylic Polymer | Acrylic Polymer of Production Ex. 2 | — | — | — | — | — | — | — | — |
| | | Acrylic Polymer of Production Ex. 3 | — | — | — | — | — | — | — | — |
| | Polyacrylic Acid | | 0.5 | 0.5 | 3 | 3 | 3 | 3 | 3 | 3 |
| | Leveling Agent | OT-P | 1 | 2 | 1 | 2 | 3 | 1 | 1 | 1 |
| | Tackifier | TAMANOL E-200NT | 30 | 30 | 30 | 30 | 30 | 10 | 20 | 25 |
| | | KE-802 | — | — | — | — | — | — | — | — |
| | | NS-100H | — | — | — | — | — | — | — | — |
| | | YS Polyster S145 | — | — | — | — | — | — | — | — |
| | | PENSEL D-125 | — | — | — | — | — | — | — | — |
| Evaluation | Solid Content Concentration (% by mass) | | 25 | 25 | 25 | 25 | 25 | 25 | 25 | 25 |
| | Viscosity (Pa · s) | | 0.95 | 0.95 | 0.95 | 0.95 | 0.95 | 0.5 | 0.5 | 0.5 |
| | Thickness of Pressure-Sensitive Adhesive Layer (μm) | | 20 | 20 | 20 | 20 | 20 | 20 | 20 | 20 |
| | Impact Resistance (J) | | 0.77 | 0.80 | 0.77 | 0.67 | 0.67 | 0.4 | 0.80 | 0.67 |
| | Evaluation of Impact Resistance | | Excellent | Excellent | Excellent | Excellent | Excellent | Excellent | Excellent | Excellent |

| | | Ex. Comparative Ex. No. | Ex. 17 | Ex. 18 | Ex. 19 | Ex. 20 | Ex. 21 | Ex. 22 |
|---|---|---|---|---|---|---|---|---|
| Water-Dispersed Pressure-Sensitive Adhesive Composition | Water-Dispersible Polymer | Water-Dispersible Polymer of Production Ex. 1 | 100 | 100 | 100 | 100 | 100 | 100 |
| | Acrylic Polymer | Acrylic Polymer of Production Ex. 2 | — | — | — | — | — | — |
| | | Acrylic Polymer of Production Ex. 3 | — | — | — | — | — | — |

TABLE 2-continued

|  |  |  |  |  |  |  |  |  |
|---|---|---|---|---|---|---|---|---|
|  |  | Polyacrylic Acid |  | 3 | 3 | 3 | 3 | 3 | 3 |
|  |  | Leveling Agent | OT-P | 1 | 1 | 1 | 1 | 1 | 1 |
|  |  | Tackifier | TAMANOL E-200NT | 30 | 35 | 40 | — | — | 30 |
|  |  |  | KE-802 | — | — | — | 35 | — | — |
|  |  |  | NS-100H | — | — | — | — | 35 | — |
|  |  |  | YS Polyster S145 | — | — | — | — | — | — |
|  |  |  | PENSEL D-125 | — | — | — | — | — | — |
| Evaluation |  | Solid Content Concentration (% by mass) |  | 25 | 25 | 25 | 25 | 25 | 25 |
|  |  | Viscosity (Pa · s) |  | 0.5 | 0.5 | 0.5 | 0.95 | 0.95 | 0.5 |
|  |  | Thickness of Pressure-Sensitive Adhesive Layer (μm) |  | 20 | 20 | 20 | 20 | 20 | 26* |
|  |  | Impact Resistance (J) |  | 0.77 | 0.89 | 0.279 | 0.802 | 0.213 | 0.50 |
|  |  | Evaluation of Impact Resistance |  | Excellent | Excellent | Excellent | Excellent | Excellent | Excellent |

*13-μm pressure-sensitive adhesive layer was formed on both surfaces of polymer film.

TABLE 3

|  | Ex. Comparative Ex. No. |  | Comparative Ex. 5 | Comparative Ex. 6 | Comparative Ex. 7 | Comparative Ex. 8 | Comparative Ex. 9 |
|---|---|---|---|---|---|---|---|
| Water-Dispersed Pressure-Sensitive Adhesive Composition | Water-Dispersible Polymer | Water-Dispersible Polymer of Production Ex. 1 | — | — | — | — | — |
|  | Acrylic Polymer | Acrylic Polymer of Production Ex. 2 | 100 | 100 | 100 | — | — |
|  |  | Acrylic Polymer of Production Ex. 3 | — | — | — | 100 | 100 |
|  | Polyacrylic Acid |  | — | — | — | — | — |
|  | Leveling Agent | OT-P | — | — | — | — | — |
|  | Tackifier | TAMANOL E-200NT | — | — | — | — | — |
|  |  | KE-802 | — | — | — | — | — |
|  |  | NS-100H | — | — | — | — | — |
|  |  | YS Polyster S145 | 20 | 20 | 20 | — | — |
|  |  | PENSEL D-125 | — | — | — | 30 | 30 |
| Evaluation | Solid Content Concentration (% by mass) |  | 23 | 23 | 23 | 25 | 25 |
|  | Viscosity (Pa · s) |  | 0.2 | 0.2 | 0.2 | 0.3 | 0.3 |
|  | Thickness of Pressure-Sensitive Adhesive Layer (μm) |  | 5 | 10 | 20 | 5 | 10 |
|  | Impact Resistance (J) |  | 0.00 | 0.00 | 0.06 | 0 | 0.15 |
|  | Evaluation of Impact Resistance |  | Bad | Bad | Bad | Bad | Bad |

|  | Ex. Comparative Ex. No. |  | Comparative Ex. 10 | Comparative Ex. 11 | Comparative Ex. 12 | Comparative Ex. 13 |
|---|---|---|---|---|---|---|
| Water-Dispersed Pressure-Sensitive Adhesive Composition | Water-Dispersible Polymer | Water-Dispersible Polymer of Production Ex. 1 | — | — | — | — |
|  | Acrylic Polymer | Acrylic Polymer of Production Ex. 2 | — | — | — | — |
|  |  | Acrylic Polymer of Production Ex. 3 | 100 | 100 | 100 | 100 |
|  | Polyacrylic Acid |  | — | — | — | — |
|  | Leveling Agent | OT-P | — | — | — | — |
|  | Tackifier | TAMANOL E-200NT | — | — | — | — |
|  |  | KE-802 | — | — | — | — |
|  |  | NS-100H | — | — | — | — |
|  |  | YS Polyster S145 | — | — | — | 20 |
|  |  | PENSEL D-125 | 30 | 30 | 30 | — |
| Evaluation | Solid Content Concentration (% by mass) |  | 25 | 45 | 45 | 23 |
|  | Viscosity (Pa · s) |  | 0.3 | 3.0 | 3.0 | 0.2 |
|  | Thickness of Pressure-Sensitive Adhesive Layer (μm) |  | 20 | 50 | 100 | 26* |
|  | Impact Resistance (J) |  | 0.181 | 1.89 | 2.02 | 0.14 |
|  | Evaluation of Impact Resistance |  | Bad | Bad | Bad | Bad |

*13-μm pressure-sensitive adhesive layer was formed on both surfaces of polymer film.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICATION

The pressure-sensitive adhesive layer and the pressure-sensitive adhesive sheet of the present invention can be preferably used in, in particular, the production of electronic devices.

DESCRIPTION OF REFERENCE NUMERALS

1 Pressure-sensitive adhesive layer
11 Substrate

The invention claimed is:

1. A pressure-sensitive adhesive layer consisting of
a dried product of a water-dispersed pressure-sensitive adhesive composition, wherein
the water-dispersed pressure-sensitive adhesive composition contains a water-dispersible polymer, water, polyacrylic acid, and a leveling agent;
the polyacrylic acid content is above 0.1 parts by mass and below 2.5 parts by mass with respect to 100 parts by mass of the water-dispersible polymer, and the leveling agent content is 150 parts by mass or more and 500 parts by mass or less with respect to 100 parts by mass of the polyacrylic acid, or
the polyacrylic acid content is 2.5 parts by mass or more and 7 parts by mass or less with respect to 100 parts by mass of the water-dispersible polymer, and the leveling agent content is 10 parts by mass or more and below 150 parts by mass with respect to 100 parts by mass of the polyacrylic acid; and
a thickness of the pressure-sensitive adhesive layer is 10 µm or more and 40 µm or less.

2. The pressure-sensitive adhesive layer according to claim 1, wherein
the leveling agent content is 1 part by mass or more with respect to 100 parts by mass of the water-dispersible polymer.

3. The pressure-sensitive adhesive layer according to claim 1, wherein
a viscosity at 25° C. of the water-dispersed pressure-sensitive adhesive composition is below 1.5 Pa·s.

4. A pressure-sensitive adhesive sheet comprising:
a substrate and
the pressure-sensitive adhesive layer according to claim 1 in order toward one side in a thickness direction, wherein
the substrate is a foam.

5. A pressure-sensitive adhesive sheet comprising:
a substrate and
the pressure-sensitive adhesive layer according to claim 1 in order toward one side in a thickness direction, wherein
the substrate is a polymer film.

* * * * *